(12) United States Patent
Kang (10) Patent No.: US 11,281,714 B2
(45) Date of Patent: Mar. 22, 2022

(54) IMAGE RETRIEVAL (71) Applicant: Beijing Sankuai Online Technology Co., Ltd, Beijing (CN)

(72) Inventor: Liping Kang, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 0 days.

(21) Appl. No.: 16/762,139

(22) PCT Filed: Oct. 18, 2018

(86) PCT No.: PCT/CN2018/110865
§ 371 (c)(1),
(2) Date: May 6, 2020

(87) PCT Pub. No.: WO2019/085765
PCT Pub. Date: May 9, 2019

(65) Prior Publication Data
US 2020/0364259 A1 Nov. 19, 2020

(30) Foreign Application Priority Data
Nov. 6, 2017 (CN) .......................... 201711078740.7

(51) Int. Cl.
*G06F 16/00* (2019.01)
*G06F 16/583* (2019.01)
(Continued)

(52) U.S. Cl.
CPC .......... *G06F 16/5854* (2019.01); *G06F 16/51* (2019.01); *G06K 9/6215* (2013.01);
(Continued)

(58) Field of Classification Search
CPC ....... G06F 16/5854; G06F 16/51; G06K 9/46; G06K 9/6215; G06N 3/08; G06N 3/04
See application file for complete search history.

(56) References Cited

U.S. PATENT DOCUMENTS 6,996,280 B1 * 2/2006 Matsukawa ............. G06T 9/004
382/236
10,628,736 B2 * 4/2020 Tizhoosh .............. G06F 16/583
(Continued)

FOREIGN PATENT DOCUMENTS

| CN | 101639983 A | 2/2010 |
|---|---|---|
| CN | 102419820 A | 4/2012 |

(Continued)

OTHER PUBLICATIONS

Shan et al., Image Retrieval Based on Bit-plane Distribution Entropy, 2008 International Conf. on Computer Science and Software Engineering, pp. 532-535 (Year: 2008).*
(Continued)

*Primary Examiner* — Ping Y Hsieh
*Assistant Examiner* — Xiao Liu
(74) *Attorney, Agent, or Firm* — Kilpatrick Townsend & Stockton LLP (57) ABSTRACT

An image retrieval method is provided. According to an example of the method, based on a first image feature of an image to be retrieved, a binary feature of the image to be retrieved may be determined, and an information entropy code of the image to be retrieved may be further determined based on the binary feature of the image to be retrieved. Then, based on the information entropy code of the image to be retrieved, images similar to the image to be retrieved may be retrieved in a preset image library.

17 Claims, 3 Drawing Sheets

(51) Int. Cl.
  *G06F 16/51*  (2019.01)
  *G06K 9/62*  (2022.01)
  *G06N 3/04*  (2006.01)
  *G06N 3/08*  (2006.01)
  *G06V 10/40*  (2022.01)

(52) U.S. Cl.
  CPC ............. *G06N 3/04* (2013.01); *G06N 3/08* (2013.01); *G06V 10/40* (2022.01)

(56) References Cited

U.S. PATENT DOCUMENTS

2002/0087538 A1  7/2002  Abdel-Mottaleb et al.
2016/0357748 A1  12/2016  Hsiao

FOREIGN PATENT DOCUMENTS

| CN | 106354850 A | 1/2017 |
| CN | 106445939 A | 2/2017 |
| CN | 106874421 A | 6/2017 |
| CN | 106909924 A | 6/2017 |
| CN | 107122809 A | 9/2017 |
| CN | 108090117 A | 5/2018 |
| JP | 2015056077 A | 3/2015 |
| JP | 6041439 B2 | 12/2016 |

OTHER PUBLICATIONS

Tomas M. Cover et al., Chapter 2, Entropy, Relative Entropy and Mutual Information, Elements of Information Theory, 1991 John Wiley & Sons, Inc. (Year: 1991).*
European Patent Office, Extended European Search Report Issued in Application No. 18874554.1, dated Nov. 26, 2020, Germany, 12 pages.
ISA State Intellectual Property Office of the People's Republic of China, Written Opinion of the International Searching Authority Issued in Application No. PCT/CN2018/110865, dated Jan. 17, 2019, WIPO, 11 pages.
Anonymous:"Entropy encoding—Wikipedia", Retrieved from the Internet: URL:https://en.wikipedia.org/w/index.php?title=Entropy_encoding&oldid=805743669, XP055751942, Oct. 17, 2017, 2 pages.
State Intellectual Property Office of the People's Republic of China, Office Action and Search Report Issued in Application No. 2017110787407, dated Aug. 29, 2018, 15 pages, (Submitted with Machine Translation).
ISA State Intellectual Property Office of the People's Republic of China, International Search Report Issued in Application No. PCT/CN2018/110865, dated Jan. 17, 2019, WIPO, 4 pages.
Wang Song, "Entropy Based Image Retrieval" Chinese Master's These Full-text Database, No. 3.15 , Sep. 15, 2003,53 pages.
Hu tan gao, et al."Image Retrieval Based on Limited Hue Value on Information Entropy" Remote Sensing Technology and A pplication, vol. 22, No. 4, Aug. 2007, 7 pages.

* cited by examiner

IMAGE RETRIEVAL

CROSS-REFERENCE TO RELATED APPLICATIONS

This patent application is a National Stage of International Application No. PCT/CN2018/110865, filed Oct. 18, 2018, which claims priority to Chinese Patent Application No. 201711078740.7, filed on Nov. 6, 2017 and entitled "Image Retrieval Method and Apparatus, and Electronic Device", the entire contents of which are incorporated herein by reference.

TECHNICAL FIELD

This application relates to the technical field of computers, and more particularly, to an image retrieval method and apparatus, and an electronic device.

BACKGROUND

Image retrieval is the process of finding the most similar images in a preset image database based on an image feature of an image to be retrieved, and is widely used in related technologies. A commonly used image retrieval method is to compare an image feature of an image to be searched with image features of images stored in an image database one by one to determine an image with the highest similarity. However, with the development of an Internet technology and the development of a storage technology, the data volume of the image database is increasing. During image search in a massive image database, the retrieval efficiency of the image retrieval method is extremely low.

SUMMARY

Various embodiments provide an image retrieval method to improve the efficiency of image retrieval.

In order to solve the above problems, in a first aspect, one embodiment provides an image retrieval method, which includes: determining, based on a first image feature of an image to be retrieved, a binary feature of the image to be retrieved; determining, based on the binary feature of the image to be retrieved, an information entropy code of the image to be retrieved; and retrieving, based on the information entropy code of the image to be retrieved, images similar to the image to be retrieved in a preset image library. The images stored in the preset image library are indexed by the information entropy code.

In a second aspect, one embodiment provides an image retrieval apparatus, which includes: a binary feature acquiring module, configured to determine, based on a first image feature of an image to be retrieved, a binary feature of the image to be retrieved; an information entropy code determining module, configured to determine, based on the binary feature of the image to be retrieved, an information entropy code of the image to be retrieved; and an image retrieval module, configured to retrieve, based on the information entropy code of the image to be retrieved, images similar to the image to be retrieved in a preset image library. The images in the preset image library are indexed by the information entropy code.

In a third aspect, one embodiment provides an electronic device, which includes a memory, a processor, and a computer program stored in the memory and executable on the processor. The computer program, when executed by the processor, implements the image retrieval method described in the embodiments of this application.

In a fourth aspect, one embodiment provides a computer-readable storage medium storing a computer program, the computer program, when executed by a processor, implementing the steps of the image retrieval method described in the embodiments of this application.

According to the image retrieval method in accordance with the present disclosure, based on a first image feature of an image to be retrieved, a binary feature of the image to be retrieved is determined; based on the binary feature of the image to be retrieved, an information entropy code of the image to be retrieved is determined; and based on the information entropy code of the image to be retrieved, images similar to the image to be retrieved are retrieved in a preset image library. Therefore, the efficiency of image retrieval can be effectively improved. By using an information entropy based on binary features of images as an image code, images are indexed and retrieved. Compared with the direct comparison of binary features or image features, the data volume of comparison data is greatly reduced, and efficiency of image retrieval is effectively improved.

BRIEF DESCRIPTION OF THE DRAWINGS

To describe the technical solutions of the embodiments of this application more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DETAILED DESCRIPTION OF THE EMBODIMENTS

The following clearly and completely describes the technical solutions in various embodiments with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
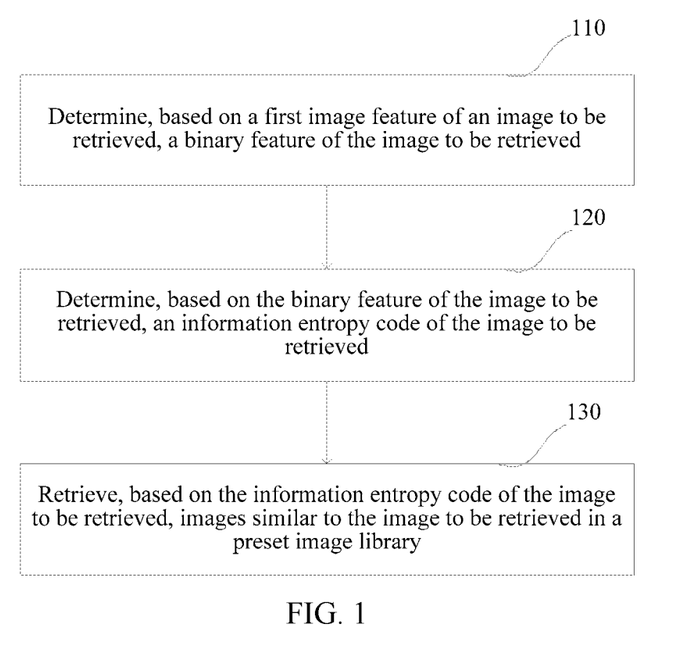
FIG. 1 is a flowchart of an image retrieval method according to a first embodiment of this application.

As shown in FIG. 1, an image retrieval method in accordance with this embodiment includes step 110 to step 130.

In step 110, based on a first image feature of an image to be retrieved, a binary feature of the image to be retrieved is determined.

First, a first image feature of an image to be retrieved is acquired.

Common image features include texture features, color features, shape features, spatial relationship features, etc. Different features are suitable for different image contents and different image recognition needs. Common feature extraction methods include a Fourier transformation method, a Gabor transformation method, a wavelet transformation method, a neural network model extraction method, etc. During example implementation, a specific method for acquiring an image feature of an image to be retrieved may adopt any method well known to those skilled in the art, such as a method of extracting an image feature of an image to be retrieved using a convolutional neural network (CNN) model. This application does not limit a example implementation method of acquiring an image feature of an image to be retrieved. Preferably, an image feature of an image to be retrieved is extracted using a CNN model.

The CNN model extracts an image feature of an image to be retrieved. That is, a convolutional neural network feature (hereinafter also referred to as a CNN feature) can better express higher-level semantic features of an image, and have been well applied in the fields of image classification, recognition and detection. In the embodiments of this application, the CNN feature is taken as the first image feature to describe an image retrieval technical solution in detail.

Then, based on the first image feature of the image to be retrieved, a binary feature of the image to be retrieved is determined.

The image feature is usually a multi-dimensional vector. During example implementation, the acquired first image feature of the image to be retrieved may be binarized through a binarization scheme well known to those skilled in the art to extract the binary feature of the image to be retrieved. For example, a feature value Xi of each dimension of the CNN feature is traversed, and the CNN feature of the image to be retrieved is binarized according to the following rules:

If $Xi > TH$: $B(Xi)=1$;

else: $B(Xi)=0$.

TH is a threshold set according to experience. The setting of the threshold is expected to make the distribution of 0 and 1 in the binarized feature as uneven as possible to increase the discrimination of the image. For example, the value may be 0.5.

In step 120, based on the binary feature of the image to be retrieved, an information entropy code of the image to be retrieved is determined.

An information entropy is usually used to measure the distribution of information. During the example implementation of this application, after the binary feature is determined, the information entropy of the binary feature may be used as an information entropy code of the image to be retrieved to which the binary feature belongs. Then, similar images are determined according to the information entropy code.

In step 130, based on the information entropy code of the image to be retrieved, images similar to the image to be retrieved are retrieved in a preset image library.

During example implementation, the preset image library may use an information entropy code of an image as an index of the image, and then determined similar images by comparing based on the information entropy code. During example implementation, since the information entropy code reflects the binary feature of the image to a certain extent, the corresponding image similarity is also high as the information entropy code is similar. By comparing the information entropy codes, similar images may be preliminarily determined. Further, similarities between the similar images may be determined based on image features, so that the images that match the image to be retrieved in the preset image library may be retrieved more accurately.

According to the image retrieval method in accordance with this embodiment, based on a first image feature of an image to be retrieved, a binary feature of the image to be retrieved is determined; based on the binary feature of the image to be retrieved, an information entropy code of the image to be retrieved is determined; and based on the information entropy code of the image to be retrieved, images similar to the image to be retrieved are retrieved in a preset image library. Therefore, the efficiency of image retrieval can be effectively improved. By using an information entropy based on binary features of images as an image code, images are indexed and retrieved. Compared with the direct comparison of binary features or image features, the data volume of comparison data is greatly reduced, and efficiency of image retrieval is effectively improved.

Figure 2:
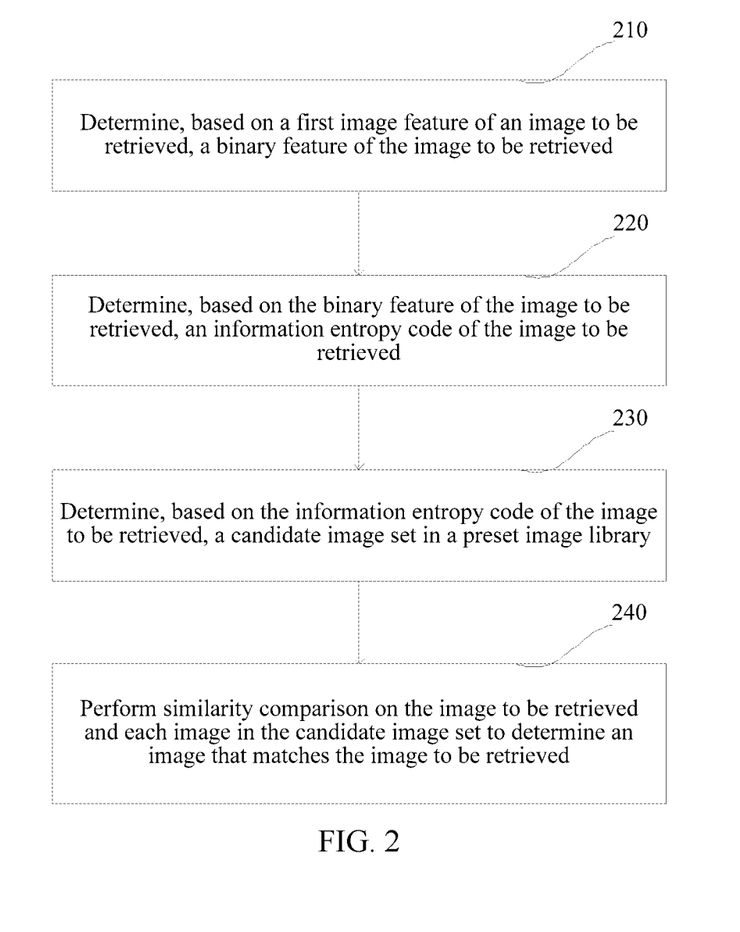
FIG. 2 is a flowchart of an image retrieval method according to a second embodiment of this application.

As shown in FIG. 2, an image retrieval method in accordance with another embodiment includes step 210 to step 240.

In step 210, based on a first image feature of an image to be retrieved, a binary feature of the image to be retrieved is determined.

First, a first image feature of an image to be retrieved is acquired.

In some embodiments such as here, the first image feature is a CNN feature. A CNN model extracts a first image feature of an image to be retrieved. That is, a CNN feature can better express higher-level semantic features of the image, and has been well applied in the fields of image classification, recognition and detection. In this embodiment, an implementation scheme of the image retrieval method is specifically described with an example that a CNN model extracts a CNN feature of an image to be retrieved.

ImageNet1000 is a computer vision system based on a deep convolutional neural network, and trains a CNN model on 1000 image classification problems. InceptionV3 uses a model pre-trained on ImageNet1000, which is widely used in the field of image processing. During the example implementation of this application, the CNN feature of the image to be retrieved is extracted as the first image feature of the image to be retrieved through InceptionV3. During example implementation, an image to be retrieved is input into an InceptionV3 model, and output parameters of a "pool_8× 8_s1" layer of the model are acquired as feature expressions of the image to be retrieved. The feature is a 2048-dimensional (float type) feature vector, which may be expressed as:

$$X=[x_1,x_2,\ldots,x_i,\ldots,x_N], i\in[1,N] X=[x_1,x_2,\ldots,x_i,\ldots,x_N], i\in[1,N].$$

N represents the dimension of a feature. For example, N=2048. The pool_8×8_s1 layer is a network layer closest to a loss layer in an InceptionV3 network structure, which can best represent semantic features of the image and is more common in the field of image research.

Then, based on the first image feature of the image to be retrieved, a binary feature of the image to be retrieved is determined.

A example implementation of determining, based on the first image feature of the image to be retrieved, a binary feature of the image to be retrieved may refer to the first embodiment and will not be repeated here.

By binarizing the acquired first image feature X of the image to be retrieved, an N-dimensional binary feature will be obtained in this step, which may be expressed as:

$$X'=[x'_1,x'_2,\ldots,x'_i,\ldots,x'_N], i\in[1,N].$$

N represents the dimension of a feature. For example, N=2048.

In step 220, based on the binary feature of the image to be retrieved, an information entropy code of the image to be retrieved is determined.

An information entropy is usually used to measure the distribution of information. The operation of determining, based on the binary feature of the image to be retrieved, the information entropy code of the image to be retrieved includes: determining a probability distribution of each feature value in the binary feature of the image to be retrieved; determining an information entropy of the binary feature based on the probability distribution; and discretizing the information entropy within a preset value range to obtain the information entropy code of the image to be retrieved.

During example implementation, a probability distribution of each feature value in the binary feature of the image to be retrieved is first determined. For example, the probability distribution of 0 and 1 in the binary feature is determined. Then, an information entropy of the binary feature is determined based on the probability distribution. During example implementation, the information entropy of the binary feature may be calculated by the following formula:

$$\text{Entropy}_{feature}=-p_0\log(p_0)-p_1\log(p_1), \text{Entropy}_{feature}\in[0,1]$$

$p_0$ is a distribution probability of a feature value 0 in the binary feature, and $p_1$ is a distribution probability of a feature value 1 in the binary feature. During example implementation, the distribution probability of 0 and 1 in a binary feature X′ may be calculated by the following formula:

$$p_0 = \frac{num(0)}{N}; p_1 = \frac{num(1)}{N}.$$

N is a feature dimension of the binary feature X′.

After the information entropy of the binary feature of the image to be retrieved is determined, discretization coding is performed on the information entropy within a preset value range to determine the information entropy code of the image to be retrieved. During example implementation, discretization coding may be performed on the information entropy by the following formula:

$$Q(\text{Entropy}_{feature})=\text{int}(K*\text{Entropy}_{feature}), Q(\text{Entropy}_{feature})\in[0,K].$$

K is a preset value range, which may be determined according to a value range of the information entropy code. For example, because the value range of the information entropy is 0 to 1, if the value range of the information entropy code is expected to be between 0 and 100, the value of K is 100.

The information entropy is usually used to measure the distribution of information, and the binary feature may express image features. Therefore, the information entropy code of the binary feature may be used as a compressed expression of image features. For example, after information entropy coding of the binary feature, it may be obtained that the information entropy code corresponding to the image to be retrieved is 60. After the information entropy code of the image to be retrieved is determined, images similar to the image to be retrieved may be further retrieved in a preset image library based on the information entropy code. During example implementation, the operation of retrieving, based on the information entropy code, the images similar to the image to be retrieved in the preset image library may include: first, determining, based on the information entropy code, a candidate image set in the preset image library; and then, performing similarity comparison on the image to be retrieved and each image in the candidate image set to determine one or more images that match the image to be retrieved in terms of similarity.

In step 230, based on the information entropy code, a candidate image set is determined in the preset image library.

The images in the preset image library are indexed by the information entropy code.

During the example implementation, it is first necessary to use the preset image library as an object for retrieving the image to be retrieved. During example implementation, the preset image library may use an information entropy code of an image as an index of the image. For example, a data format in the preset image library may be a key-value pair in the form of (information entropy codes or images). The information entropy code serves as the index of the image. The method for acquiring an information entropy code of an image in a preset image library is similar to the method for acquiring an information entropy code of an image to be retrieved, and will not be repeated here.

The operation of determining, based on the information entropy code of the image to be retrieved, the candidate image set in the preset image library includes: determining images, having the information entropy code different from the information entropy code of the image to be retrieved by a value less than a preset threshold, in the preset image library as candidate matching images; and combining the multiple candidate matching images into the candidate image set. During example implementation, the preset threshold may be, for example, 10. For an image to be retrieved with an information entropy code of 60, images with the information entropy code in a range of [50, 70] in the preset image library are selected as a matching candidate set of the image to be retrieved. In this way, compared with the information entropy code of [0, 100] in the image library, the retrieval volume may be reduced by 80%, and the retrieval efficiency is greatly improved. It is to be noted that the preset threshold of the difference between the information entropy code of the image in the image library and the information entropy code of the image to be retrieved may be determined according to an experimental effect in a specific application scenario. As the threshold is smaller, the information entropy code range of the index is smaller, the corresponding candidate image set is smaller, the retrieval efficiency is higher, but the accuracy may be lower. On the contrary, as the threshold is larger, the information entropy code range of the index is larger, the corresponding candidate image set is larger, the retrieval efficiency is lower, but the accuracy may be higher.

During example implementation, the difference between the information entropy code of the image to be retrieved and the information entropy code of all images in the preset image library may be calculated first, images corresponding to the information entropy code having a difference less than a preset threshold (for example, 10) are used as candidate matching images, and then all the candidate matching images are combined into a candidate image set. The information entropy code of the image may effectively express the feature distribution of the image. Each image in the preset image library corresponds to an information entropy code, and the image to be retrieved also corresponds to an information entropy code. And, as the similarity between two images is higher, the corresponding information entropy codes are closer. Therefore, images with a difference of information entropy codes within a certain range will have a higher similarity. By matching the information entropy codes within a certain range, the range of the image to be retrieved may be greatly reduced.

In step 240, similarity comparison is performed on the image to be retrieved and each image in the candidate image set to determine an image that matches the image to be retrieved.

The images in the candidate image set are images that are preliminarily determined to have a high similarity to the image to be retrieved. In order to improve the accuracy of the retrieval result, during the example implementation of this application, similarity comparison may be further performed on each image in the candidate image set and the image to be retrieved.

During example implementation, the operation of performing similarity comparison on the image to be retrieved and each image in the candidate image set to determine an image that matches the image to be retrieved includes: determining second image features of the image to be retrieved and each image in the candidate image set; calculating, based on the second image features, a similarity score between the image to be retrieved and each image in the candidate image set, respectively; and determining, in descending order of the similarity scores, an image that matches the image to be retrieved in the candidate image set. First, a second image feature of the image to be retrieved and a second image feature of each image in the candidate image set are acquired respectively. The second image feature may be a feature of the same category as the first image feature. For example, both the first image feature and the second image feature are CNN features. The second image feature may also be a feature of a different category from the first image feature. For example, the first image feature is a CNN feature, and the second image feature is a traditional image feature such as a Gabor feature. Then, a Euclidean distance between the second image feature of the image to be retrieved and the second image feature of each image in the candidate image set is calculated to determine a similarity score of the two images. During example implementation, the method for determining the similarity between two images is not limited to calculating the Euclidean distance, and any method well known to those skilled in the art may also be used to calculate the similarity between the two images, which is not limited in this application.

Finally, in descending order of the similarity scores, the images in the candidate image set are sorted to determine an image that matches the image to be retrieved. During example implementation, by image matching of the image to be retrieved in the candidate image set based on the second image feature, an image with the highest similarity may be determined as a final retrieval result. In some specific applications, the similarity between the image to be retrieved and each image in the candidate image set may also be matched to determine a similarity score between the image to be retrieved and each image in the candidate image set, the images are then sorted in descending order of similarity, and the sorted images in the candidate image set are fed back.

In some embodiments as here, the second image feature may be a combined feature including at least two image features. For example, the second image feature may include the first image feature. In order to improve the accuracy of image retrieval, finer and richer features of images may be extracted during similarity comparison. For example, the second image feature may be a combined feature of a CNN feature and a Gabor feature.

According to the image retrieval method disclosed herein, based on a first image feature of an image to be retrieved, a binary feature of the image to be retrieved is determined; based on the binary feature of the image to be retrieved, an information entropy code of the image to be retrieved is determined; based on the information entropy code of the image to be retrieved, a candidate image set is determined in a preset image library; and finally, image feature matching is further performed in the candidate image set. Therefore, the efficiency of image retrieval can be effectively improved. By using an information entropy based on binary features of images as an image code, images are indexed and retrieved. Compared with the direct comparison of binary features or image features, the processing amount of comparison data is greatly reduced, and efficiency of image retrieval is effectively improved.

Based on the characteristic that similar images correspond to similar information entropy codes, multiple candidate matching images are preliminarily determined according to information entropy codes, and then feature matching is performed between an image to be retrieved and the candidate matching images one by one. In this way, the comparison of the information entropy codes effectively reduces an image range of feature matching and reduces the amount of matching operations, thereby effectively improving the efficiency of image retrieval. Moreover, compared with a method of directly comparing image binary features, this application compares original features of the entire image, the features are more comprehensive, and the retrieval effect is more accurate. Further, a CNN feature can better express higher-level semantic features of an image, and image similarity matching is performed based on the CNN feature, so that the accuracy of image matching can be effectively ensured.

Figure 3:
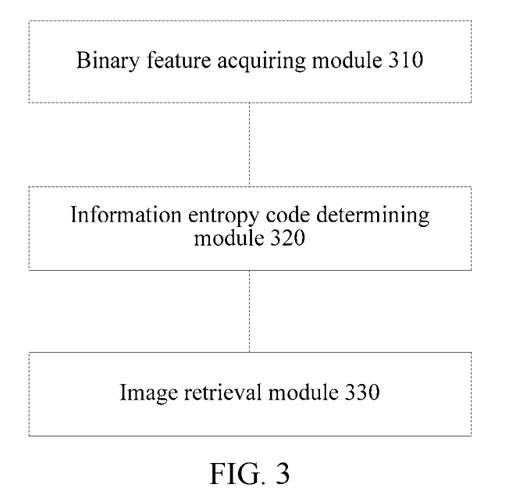
FIG. 3 is a first schematic structure diagram of an image retrieval apparatus according to a third embodiment of this application.

As shown in FIG. 3, an image retrieval apparatus disclosed in this embodiment includes:

a binary feature acquiring module 310, configured to determine, based on a first image feature of an image to be retrieved, a binary feature of the image to be retrieved;

an information entropy code determining module 320, configured to determine, based on the binary feature of the image to be retrieved, an information entropy code of the image to be retrieved; and an image retrieval module 330, configured to retrieve, based on the information entropy code of the image to be retrieved, images similar to the image to be retrieved in a preset image library, the images in the preset image library being indexed by the information entropy code.

During example implementation, the preset image library uses an information entropy code of a binary feature of an image as an index of the image.

Figure 4:
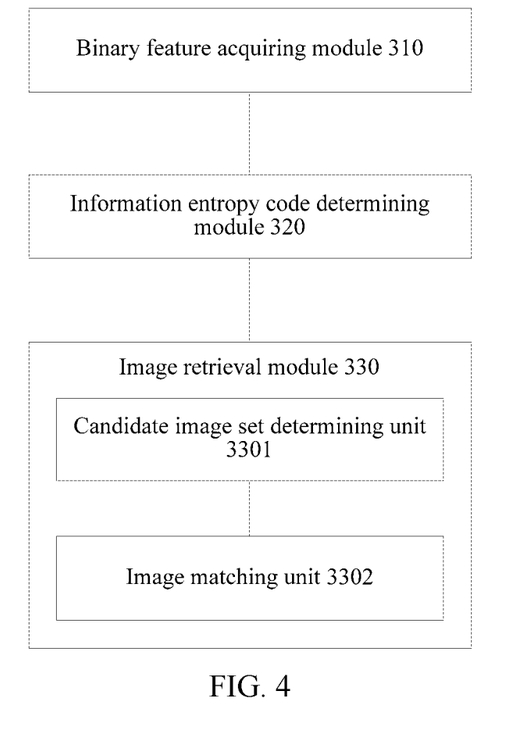
FIG. 4 is a second schematic structure diagram of an image retrieval apparatus according to a third embodiment of this application.

In some embodiments, as shown in FIG. 4, the image retrieval module 330 includes:

a candidate image set determining unit 3301, configured to determine, based on the information entropy code determined by the information entropy code determining module 320, a candidate image set in the preset image library; and an image matching unit 3302, configured to perform similarity comparison on the image to be retrieved and each image in the candidate image set to determine an image that matches the image to be retrieved.

In some embodiments, the image matching unit 3302 is further configured to: determine second image features of the image to be retrieved and each image in the candidate image set; calculate, based on the second image features, a similarity score between the image to be retrieved and each image in the candidate image set, respectively; and determine, in descending order of the similarity scores, an image that matches the image to be retrieved in the candidate image set.

In some embodiments, the second image feature is a combined feature including at least two image features. For example, the second image feature includes the first image feature.

In some embodiments, the candidate image set determining unit 3301 is further configured to determine images, having the information entropy code different from the information entropy code of the image to be retrieved by a value less than a preset threshold, in the preset image library as candidate matching images, and combine the candidate matching images into the candidate image set.

In some embodiments, the first image feature is a CNN feature.

In some embodiments, the information entropy code determining module 320 is further configured to: determine a probability distribution of each feature value in the binary feature of the image to be retrieved; determine an information entropy of the binary feature based on the probability distribution; and discretize the information entropy within a preset value range to obtain the information entropy code of the image to be retrieved.

According to the image retrieval apparatus disclosed in this embodiment of this application, based on a first image feature of an image to be retrieved, a binary feature of the image to be retrieved is determined; based on the binary feature of the image to be retrieved, an information entropy code of the image to be retrieved is determined; and based on the information entropy code of the image to be retrieved, images similar to the image to be retrieved are retrieved in a preset image library. Therefore, the efficiency of image retrieval can be effectively improved. By using an information entropy based on binary features of images as an image code, images are indexed and retrieved. Compared with the direct comparison of binary features or image features, the processing amount of comparison data is greatly reduced, and efficiency of image retrieval is effectively improved.

Based on the characteristic that similar images correspond to similar information entropy codes, multiple candidate matching images are preliminarily determined according to information entropy codes, and then feature matching is performed between an image to be retrieved and the candidate matching images one by one. In this way, the comparison of the information entropy codes effectively reduces an image range of feature matching and reduces the amount of matching operations, thereby effectively improving the efficiency of image retrieval. Moreover, compared with a method of directly comparing image binary features, this application compares original features of the entire image, the features are more comprehensive, and the retrieval effect is more accurate. Further, a CNN feature can better express higher-level semantic features of an image, and image similarity matching is performed based on the CNN feature, so that the accuracy of image matching can be effectively ensured.

Correspondingly, various embodiments further provide an electronic device, including a memory, a processor, and a computer program stored in the memory and executable on the processor, where when the processor executes the computer program, the image retrieval methods according to the first embodiment and the second embodiment of this application are implemented. The electronic device may be a personal computer (PC), a mobile terminal, a personal digital assistant, a tablet computer, or the like.

Various embodiments further provide a computer-readable storage medium storing a computer program, the computer program, when executed by a processor, implementing the steps of the image retrieval methods according to the first embodiment and the second embodiment of this application.

The embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly; for related parts, reference may be made to the corresponding descriptions in the method embodiment.

The image retrieval method and apparatus provided in the embodiments of this application are described in detail above. The principle and implementations of this application are described herein by using specific examples. The descriptions of the foregoing embodiments are merely used for helping understand the method and core ideas of this application. In addition, a person of ordinary skill in the art can make variations to this application in terms of the example implementations and application scopes according to the ideas of this application. Therefore, the content of this specification shall not be construed as a limitation on this application.

Based on the foregoing descriptions of the implementations, a person skilled in the art may clearly understand that the implementations may be implemented by software plus a necessary general hardware platform, or certainly may be implemented by hardware. Based on such an understanding, the foregoing technical solutions essentially or the part contributing to the prior art may be implemented in the form of a software product. The computer software product is stored in a computer-readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

The invention claimed is:

1. An image retrieval method, comprising:
    determining, based on a first image feature of an image to be retrieved, a binary feature of the image to be retrieved;
    determining, based on the binary feature of the image to be retrieved, an information entropy code of the image to be retrieved that measures distribution of image information; and
    retrieving, based on the information entropy code of the image to be retrieved, images similar to the image to be retrieved in a preset image library, the images in the preset image library being indexed by the information entropy code,
    wherein determining, based on the binary feature of the image to be retrieved, the information entropy code of the image to be retrieved comprises:
    determining a probability distribution of each feature value in the binary feature of the image to be retrieved;
    determining an information entropy of the binary feature based on the probability distribution; and
    discretizing the information entropy within a preset value range to obtain the information entropy code of the image to be retrieved, wherein discretizing the information entropy within the preset value range to obtain the information entropy code of the image to be retrieved comprises:
obtaining an integer based on the preset value range and the information entropy.

2. The method according to claim 1, wherein retrieving, based on the information entropy code of the image to be retrieved, the images similar to the image to be retrieved in a preset image library comprises:
determining, based on the information entropy code of the image to be retrieved, a candidate image set in the preset image library; and
performing similarity comparison on the image to be retrieved and each image in the candidate image set to determine an image that matches the image to be retrieved.

3. The method according to claim 2, wherein performing the similarity comparison on the image to be retrieved and each image in the candidate image set to determine the image that matches the image to be retrieved comprises:
determining second image features of the image to be retrieved and of each image in the candidate image set;
for each image in the candidate image set, calculating, based on the second image features, a similarity score between the image to be retrieved and the image in the set; and
determining, in descending order of the similarity scores, an image that matches the image to be retrieved in the candidate image set.

4. The method according to claim 3, wherein
the second image feature is a combined feature comprising at least two image features, and
the second image feature comprises the first image feature.

5. The method according to claim 2, wherein the determining, based on the information entropy code of the image to be retrieved, a candidate image set in the preset image library comprises:
determining an image, having the information entropy code different from the information entropy code of the image to be retrieved by a value less than a preset threshold, in the preset image library as a candidate matching image; and
incorporating the candidate matching image into the candidate image set.

6. The method according to claim 1, wherein the first image feature is a convolutional neural network (CNN) feature.

7. An electronic device, comprising:
a memory,
a processor, and
a computer program stored on the memory and executable on the processor,
wherein when the computer program is executed by the processor, the processor is caused to perform operations comprising:
determining, based on a first image feature of an image to be retrieved, a binary feature of the image to be retrieved;
determining, based on the binary feature of the image to be retrieved, an information entropy code of the image to be retrieved that measures distribution of image information; and
retrieving, based on the information entropy code of the image to be retrieved, images similar to the image to be retrieved in a preset image library, the images in the preset image library being indexed by the information entropy code,
wherein determining, based on the binary feature of the image to be retrieved, the information entropy code of the image to be retrieved comprises:
determining a probability distribution of each feature value in the binary feature of the image to be retrieved;
determining an information entropy of the binary feature based on the probability distribution; and
discretizing the information entropy within a preset value range to obtain the information entropy code of the image to be retrieved,
wherein discretizing the information entropy within the preset value range to obtain the information entropy code of the image to be retrieved comprises:
obtaining an integer based on the preset value range and the information entropy.

8. The device according to claim 7, wherein the retrieving, based on the information entropy code of the image to be retrieved, images similar to the image to be retrieved in a preset image library comprises:
determining, based on the information entropy code of the image to be retrieved, a candidate image set in the preset image library; and
performing similarity comparison on the image to be retrieved and each image in the candidate image set to determine an image that matches the image to be retrieved.

9. The device according to claim 8, wherein the performing similarity comparison on the image to be retrieved and each image in the candidate image set to determine an image that matches the image to be retrieved comprises:
determining second image features of the image to be retrieved and each image in the candidate image set;
for each image in the candidate image set, calculating, based on the second image features, a similarity score between the image to be retrieved and the image in the set; and
determining, in descending order of the similarity scores, an image that matches the image to be retrieved in the candidate image set.

10. The device according to claim 9, wherein
the second image feature is a combined feature comprising at least two image features, and
the second image feature comprises the first image feature.

11. The device according to claim 8, wherein determining, based on the information entropy code of the image to be retrieved, the candidate image set in the preset image library comprises:
determining an image, having the information entropy code different from the information entropy code of the image to be retrieved by a value less than a preset threshold, in the preset image library as a candidate matching image; and
incorporating the candidate matching image into the candidate image set.

12. The device according to claim 7, wherein the first image feature is a convolutional neural network (CNN) feature.

13. A non-transitory computer-readable storage medium storing a computer program, wherein when the computer program is executed by a processor, the processor is caused to perform operations comprising:

determining, based on a first image feature of an image to be retrieved, a binary feature of the image to be retrieved;

determining, based on the binary feature of the image to be retrieved, an information entropy code of the image to be retrieved that measures distribution of image information; and retrieving, based on the information entropy code of the image to be retrieved, images similar to the image to be retrieved in a preset image library, the images in the preset image library being indexed by the information entropy code, wherein the determining, based on the binary feature of the image to be retrieved, the information entropy code of the image to be retrieved comprises:

determining a probability distribution of each feature value in the binary feature of the image to be retrieved;

determining an information entropy of the binary feature based on the probability distribution; and discretizing the information entropy within a preset value range to obtain the information entropy code of the image to be retrieved, wherein discretizing the information entropy within the preset value range to obtain the information entropy code of the image to be retrieved comprises:

obtaining an integer based on the preset value range and the information entropy.

14. The storage medium according to claim 13, wherein retrieving, based on the information entropy code of the image to be retrieved, the images similar to the image to be retrieved in a preset image library comprises:

determining, based on the information entropy code of the image to be retrieved, a candidate image set in the preset image library; and performing similarity comparison on the image to be retrieved and each image in the candidate image set to determine an image that matches the image to be retrieved.

15. The storage medium according to claim 14, wherein performing the similarity comparison on the image to be retrieved and each image in the candidate image set to determine an image that matches the image to be retrieved comprises:

determining second image features of the image to be retrieved and each image in the candidate image set;

for each image in the candidate image set, calculating, based on the second image features, a similarity score between the image to be retrieved and the image in the set; and determining, in descending order of the similarity scores, an image that matches the image to be retrieved in the candidate image set.

16. The storage medium according to claim 15, wherein the second image feature is a combined feature comprising at least two image features, and the second image feature comprises the first image feature.

17. The storage medium according to claim 14, wherein the determining, based on the information entropy code of the image to be retrieved, a candidate image set in the preset image library comprises:

determining an image, having the information entropy code different from the information entropy code of the image to be retrieved by a value less than a preset threshold, in the preset image library as a candidate matching image; and incorporating the candidate matching image into the candidate image set.

\* \* \* \* \*